United States Patent
Yang et al.

(10) Patent No.: US 10,979,287 B2
(45) Date of Patent: Apr. 13, 2021

(54) METHOD AND APPARATUS FOR RECEIVING A SOLUTION WHEN CONFIGURATION FUNCTION VERIFICATION FAILS IN A TERMINAL

(71) Applicant: ZTE CORPORATION, Guangdong (CN)

(72) Inventors: Lina Yang, Guangdong (CN); Chenguang Wang, Guangdong (CN); Jian Chen, Guangdong (CN)

( * ) Notice: Subject to any disclaimer, the term of this patent is extended or adjusted under 35 U.S.C. 154(b) by 92 days.

(21) Appl. No.: 15/747,881

(22) PCT Filed: May 12, 2016

(86) PCT No.: PCT/CN2016/081887
§ 371 (c)(1),
(2) Date: Jan. 26, 2018

(87) PCT Pub. No.: WO2017/016279
PCT Pub. Date: Feb. 2, 2017

(65) Prior Publication Data
US 2018/0219727 A1    Aug. 2, 2018

(30) Foreign Application Priority Data
Jul. 27, 2015   (CN) .......................... 201510447573.3

(51) Int. Cl.
*H04L 12/24*      (2006.01)
*H04L 29/08*      (2006.01)
(Continued)

(52) U.S. Cl.
CPC ...... *H04L 41/0803* (2013.01); *H04L 41/0866* (2013.01); *H04L 67/34* (2013.01);
(Continued)

(58) Field of Classification Search
CPC .. H04B 5/0031; G06K 7/10198; H04L 61/20; H04L 67/34; H04L 41/0803;
(Continued)

(56) References Cited

U.S. PATENT DOCUMENTS 6,560,699 B1 * 5/2003 Konkle ............... G06F 9/44505
713/1
6,880,107 B1 * 4/2005 Kraft, IV ............... G06F 11/08
713/2

(Continued)

FOREIGN PATENT DOCUMENTS

CN    201146522 Y    11/2008
CN    101335951 A    12/2008
(Continued)

OTHER PUBLICATIONS

Extended European Search Report dated May 18, 2018 corresponding to application No. 16829646.5-1213.
(Continued)

*Primary Examiner* — David P Zarka
(74) *Attorney, Agent, or Firm* — Bond Schoeneck & King, PLLC; George McGuire (57) ABSTRACT

A method and apparatus for terminal configuration management, wherein the method includes: receiving, by a first near field communication (NFC) terminal, configuration management data from a second NFC terminal; and performing, by the first NFC terminal, configuration update on the first NFC terminal according to the configuration management data. After receiving, by the first NFC terminal, the configuration management data from the second NFC terminal, the method further comprises: performing, by the first NFC terminal, configuration function verification on the configuration management data; transmitting, by the first NFC terminal, in a case where the configuration function verification performed on the configuration management data has
(Continued)

failed, error information corresponding to the configuration management data on which the verification has failed to the second NFC terminal; and receiving, by the first NFC terminal, a solution corresponding to the error information from the second NFC terminal.

12 Claims, 8 Drawing Sheets

(51) Int. Cl.
    *H04W 4/80*     (2018.01)
    *H04W 4/00*     (2018.01)
    *H04W 4/50*     (2018.01)

(52) U.S. Cl.
    CPC .............. *H04W 4/00* (2013.01); *H04W 4/50* (2018.02); *H04W 4/80* (2018.02)

(58) Field of Classification Search
    CPC .... H04L 41/0866; H04W 4/80; H04W 76/14; H04W 4/00; H04W 4/50
    USPC ......................................................... 709/220
    See application file for complete search history.

(56) References Cited

U.S. PATENT DOCUMENTS

| | | | | |
|---|---|---|---|---|
| 7,657,255 | B2* | 2/2010 | Abel ................ | H04B 5/0031 455/414.1 |
| 8,978,012 | B1 | 3/2015 | Poole | |
| 2002/0138757 | A1* | 9/2002 | Lynn .................... | G06F 21/572 726/1 |
| 2004/0128583 | A1* | 7/2004 | Iulo .................... | G06F 11/0709 714/25 |
| 2006/0258289 | A1* | 11/2006 | Dua .................... | H04M 1/7253 455/41.3 |
| 2007/0015463 | A1* | 1/2007 | Abel .................... | H04B 5/0031 455/41.1 |
| 2008/0184078 | A1* | 7/2008 | Herriott ................ | H04L 29/06 714/48 |
| 2010/0058306 | A1* | 3/2010 | Liles .................... | G06F 21/572 717/168 |
| 2010/0107150 | A1* | 4/2010 | Kamada .................... | G06F 8/65 717/170 |
| 2010/0114919 | A1* | 5/2010 | Sandhu ............ | H04L 29/08729 707/755 |
| 2011/0275316 | A1* | 11/2011 | Suumaki ............ | G06K 7/10237 455/41.1 |
| 2011/0287718 | A1* | 11/2011 | Abel .................... | H04B 5/0031 455/41.1 |
| 2012/0109900 | A1* | 5/2012 | Sahibzada .......... | G06Q 30/0201 707/687 |
| 2012/0265913 | A1* | 10/2012 | Suumaki ................. | H04W 4/08 710/303 |
| 2013/0095757 | A1* | 4/2013 | Abdelsamie ............ | H04W 4/50 455/41.1 |
| 2013/0322296 | A1* | 12/2013 | Arunan .................... | H04L 61/20 370/254 |
| 2014/0141716 | A1* | 5/2014 | Wang .................... | H04B 5/0031 455/41.1 |
| 2014/0173059 | A1* | 6/2014 | Koningstein ....... | H04L 41/0806 709/220 |
| 2015/0026316 | A1* | 1/2015 | Imes ........................ | F24F 11/63 709/220 |
| 2015/0074561 | A1* | 3/2015 | Zhou ...................... | G06F 3/0481 715/760 |
| 2015/0133047 | A1* | 5/2015 | Smith ................ | G06K 7/10198 455/41.1 |

FOREIGN PATENT DOCUMENTS

| | | |
|---|---|---|
| CN | 101924645 A | 12/2010 |
| CN | 103139313 A | 6/2013 |
| CN | 103366140 A | 10/2013 |
| CN | 103402015 A | 11/2013 |
| CN | 103729669 A | 4/2014 |
| CN | 103825632 A | 5/2014 |
| CN | 104601404 A | 5/2015 |
| EP | 2713633 A1 * | 9/2012 |
| EP | 2713633 A1 | 4/2014 |
| EP | 2871781 A2 | 5/2015 |
| JP | 2005-515534 A | 5/2005 |
| JP | 2014-120173 A | 6/2014 |

OTHER PUBLICATIONS

First Office Action dated Apr. 2, 2019 corresponding to Chinese application No. 201510447573.3.
First Office Action dated Jan. 29, 2019 corresponding to Japanese application No. 2018-504703.
International Search Report dated Jul. 26, 2016 corresponding to application No. PCT/CN2016/081887.
Office Action dated May 18, 2020 for application No. EP16 829 646.5.

* cited by examiner

METHOD AND APPARATUS FOR RECEIVING A SOLUTION WHEN CONFIGURATION FUNCTION VERIFICATION FAILS IN A TERMINAL

This is a National Phase Application filed under 35 U.S.C. 371 as a national stage of PCT/CN2016/081887, filed May 12, 2016, an application claiming the benefit of Chinese Application No. 201510447573.3, filed Jul. 27, 2015, the content of each of which is hereby incorporated by reference in its entirety.

TECHNICAL FIELD

This application relates to, but is not limited to, the field of communication technology.

BACKGROUND

With the introduction and rapid development of Near Field Communication (NFC) technology, products with NFC function, such as mobile phones having NFC function, NFC routers, NFC home gateways, NFC media players, etc, have gradually entered into people's lives. Features of NFC, such as easy, secure and fast wireless communication, greatly enrich and facilitate the use of end products. NFC operating modes may be divided into three types: card mode, point-to-point mode, and card reader mode. However, in the NFC point-to-point mode, there is no relevant technical proposal for performing configuration management between NFC terminal products through configuration data interaction. The NFC terminal configuration management method in existing art generally adopts the following steps: connecting, by an NFC terminal product to be configured, to a computer through a wired or wireless connection; entering into an Internet Explorer (IE) configuration page based on the computer; and changing configuration items. Disadvantages for the above method are strictly demand for environment, information security being not guaranteed, and complicated operations.

SUMMARY

The following is an overview of subject matter described in detail herein. This summary is not intended to limit the scope of the claims.

There is no effective solution for the problem of performing configuration management between NFC terminal products through configuration data interaction in the point-to-point mode in existing art.

According to an embodiment of the present disclosure, a method and apparatus for terminal configuration management are provided to perform configuration management between NFC terminal products through configuration data interaction in the point-to-point mode.

A method for terminal configuration management includes: receiving, by a first NFC terminal, configuration management data from a second NFC terminal; and performing, by the first NFC terminal, configuration update on the first NFC terminal according to the configuration management data.

Optionally, after receiving, by the first NFC terminal, the configuration management data from the second NFC terminal, the method further includes: performing, by the first NFC terminal, configuration function verification on the configuration management data; transmitting, by the first NFC terminal, in a case where the configuration function verification performed on the configuration management data has failed, error information corresponding to the configuration management data on which the verification has failed to the second NFC terminal; and receiving, by the first NFC terminal, a solution corresponding to the error information from the second NFC terminal.

Optionally, after receiving, by the first NFC terminal, a solution corresponding to the error information from the second NFC terminal, the method further includes: performing, by the first NFC terminal, configuration update on the first NFC terminal according to the solution.

Optionally, the first NFC terminal includes at least one of: a home gateway device, a router device, and an audio video player device; and the second NFC terminal includes a mobile terminal having NFC function.

A method for terminal configuration management method includes: obtaining, by a second NFC terminal, configuration management data for a first NFC terminal; and transmitting, by the second NFC terminal, the configuration management data to the first NFC terminal, wherein the configuration management data is used to perform configuration update on the first NFC terminal.

Optionally, after transmitting, by the second NFC terminal, the configuration management data to the first NFC terminal, the method further includes: receiving, by the second NFC terminal, in a case where the configuration function verification performed by the first NFC terminal on the configuration management data has failed, error information transmitted by the first NFC terminal and corresponding to the configuration management data on which the verification has failed; transmitting, by the second NFC terminal, the error information to a fault processing platform; receiving, by the second NFC terminal, a solution corresponding to the error information from the fault processing platform; and transmitting, by the second NFC terminal, the solution to the first NFC terminal.

Optionally, the method further includes: modifying, by the second NFC terminal, the configuration management data; and transmitting, by the second NFC terminal, the modified configuration management data to the first NFC terminal.

Optionally, the ways for obtaining the configuration management data for the first NFC terminal by the second NFC terminal include at least one of: downloading the configuration management data through a network, obtaining the configuration management data locally from the second NFC terminal, and receiving the configuration management data from data configuration software.

Optionally, the second NFC terminal includes a mobile terminal having NFC function; and the first NFC terminal includes at least one of: a home gateway device, a router device, and an audio video player device.

An apparatus for terminal configuration management, wherein the apparatus is applied to a first NFC terminal and includes: a receiving module configured to receive configuration management data from a second NFC terminal; and a configuring module configured to perform configuration update on the first NFC terminal according to the configuration management data.

Optionally, the apparatus further includes: a verifying module configured to perform configuration function verification on the configuration management data after the configuration management data is received from the second NFC terminal by the receiving module; a transmitting module configured to, in a case where the configuration function verification performed by the verifying module on the configuration management data has failed, transmit error information corresponding to the configuration management data on which the verification has failed to the second NFC terminal; and wherein the receiving module is further configured to receive a solution corresponding to the error information from the second NFC terminal.

Optionally, the configuring module is further configured to perform configuration update on the first NFC terminal according to the solution received by the receiving module.

Optionally, the first NFC terminal includes at least one of: a home gateway device, a router device, and an audio video player device; and the second NFC terminal includes a mobile terminal having NFC function.

An apparatus for terminal configuration management, wherein the apparatus is applied to a second NFC terminal and includes: an obtaining module configured to obtain configuration management data for a first NFC terminal; and a transmitting module configured to transmit the configuration management data obtained by the obtaining module to the first NFC terminal, wherein the configuration management data is used to perform configuration update on the first NFC terminal.

Optionally, the apparatus further includes: a receiving module configured to, in a case where the configuration function verification performed by the first NFC terminal on the configuration management data has failed, receive error information transmitted by the first NFC terminal and corresponding to the configuration management data on which the verification has failed, wherein the transmitting module is further configured to transmit the error information received by the receiving module to a fault processing platform, the receiving module is further configured to receive a solution corresponding to the error information from the fault processing platform, and the transmitting module is further configured to transmit the solution received by the receiving module to the first NFC terminal.

Optionally, the apparatus further includes: a modifying module configured to modify the configuration management data obtained by the obtaining module; wherein the transmitting module is further configured to transmit the configuration management data modified by the modifying module to the first NFC terminal.

Optionally, the obtaining module includes at least one of: a first obtaining unit configured to download the configuration management data through a network; a second obtaining unit configured to obtain the configuration management data locally from the second NFC terminal; and a third obtaining unit configured to receive the configuration management data from data configuration software.

Optionally, the second NFC terminal includes a mobile terminal having NFC function, and the first NFC terminal includes at least one of: a home gateway device, a router device, and an audio video player device.

According to the method and apparatus for terminal configuration management provided by embodiments of the present disclosure, the configuration management data is received, by the first NFC terminal, from the second NFC terminal, and the first NFC terminal performs configuration update on the first NFC terminal according to the configuration management data. Thus, in an embodiment of the present disclosure, performing configuration management between NFC terminal products through configuration data interaction in the point-to-point mode is realized, and an effect of quickly obtaining the configuration management data without relying on wired networks is achieved.

Other aspects will become apparent upon reading and understanding the drawings and detailed description.

DETAILED DESCRIPTION

Hereinafter, the embodiments of the present disclosure will be described in detail with reference to the accompanying drawings. It should be noted that, embodiments in the present application and features in the embodiments may be combined with each other arbitrarily if there is no conflict.

The steps illustrated in the flowchart in the figures may be performed in computer systems, such as by a set of computer-executable instructions. Also, though a certain logical order is illustrated in the flowchart, in some cases, the steps illustrated or described may be performed in a different order.

It should be noted that, the terms "first", "second" and the like in the description and claims of the present disclosure as well as the accompanying figures are used to distinguish between similar objects, and are not necessarily used to describe certain orders or sequences.

Figure 1:
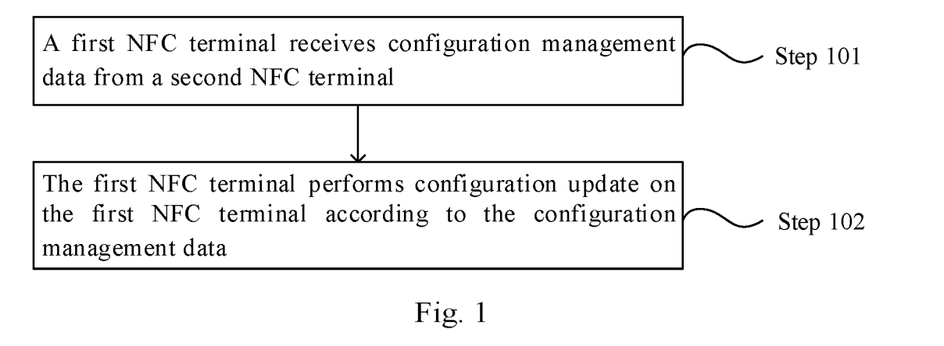
FIG. 1 is a flowchart of a method for terminal configuration management according to an embodiment of the present disclosure.

A method for terminal configuration management is provided in an embodiment of the present disclosure. FIG. 1 is a flowchart of a method for terminal configuration management according to an embodiment of the present disclosure. As illustrated in FIG. 1, the process includes the following steps, i.e., step 101 to step 102.

At step 101, a first NFC terminal receives configuration management data from a second NFC terminal.

At step 102, the first NFC terminal performs configuration update on the first NFC terminal according to the configuration management data.

Through the above steps, an NFC terminal can obtain configuration management data for performing configuration update on the NFC terminal through another NFC terminal. Compared with the method used in existing art, which includes connecting, by an NFC terminal product to be configured, to a computer through a wired or wireless connection, entering into an Internet Explorer (IE) configuration page based on the computer, and changing configuration items, through the above steps 101 and 102, performing configuration management between NFC terminal products through configuration data interaction in the point-to-point mode is realized, thereby an effect of quickly obtaining the configuration management data without relying on wired networks is achieved.

The configuration management data received by the first NFC terminal from the second NFC terminal may be incorrect. Therefore, in an optional embodiment of the present disclosure, after the first NFC terminal receives the configuration management data from the second NFC terminal, the method may further include: performing, by the first NFC terminal, configuration function verification on the configuration management data, and transmitting, by the first NFC terminal, error information corresponding to the configuration management data for which the verification has failed to the second NFC terminal, if the configuration function verification performed by the verifying module on the configuration management data has failed. Afterwards, the first NFC terminal receives a solution corresponding to the error information from the second NFC terminal. Therefore, the correctness of the configuration management data received by the first NFC terminal from the second NFC terminal can be guaranteed.

The purpose of receiving the configuration management data from the second NFC terminal by the first NFC terminal is to perform configuration update on the first NFC terminal by using correct configuration management data. In an optional embodiment of the present disclosure, after the first NFC terminal receives the solution corresponding to the error information from the second NFC terminal, the first NFC terminal may further perform configuration update on the first NFC terminal according to the solution.

In an optional embodiment of the present disclosure, the first NFC terminal includes at least one of: a home gateway device, a router device, and an audio video player device, and the second NFC terminal includes a mobile terminal having NFC function.

Through the above description of the embodiments, those skilled in the art may clearly understand that, the method according to the above embodiments may be implemented by software plus necessary universal hardware platform, and of course, may also be implemented by hardware. However, in many cases, the former is a better implementation. Based on such understanding, the embodiments of the present disclosure described above may be embodied in the form of a software product which is stored on a storage medium (such as a ROM/RAM, a magnetic disk, a compact disc) and may include several instructions for enabling a terminal device (which may be a mobile phone, a computer, a server, a network device, or the like) to execute the method described in each embodiment of the present disclosure.

An embodiment of the present disclosure further provides an apparatus for terminal configuration management. The apparatus is configured to implement the above embodiments and optional implementations, and descriptions that have been made will not be repeated here again. As used below, the term "module" may be a combination of software and/or hardware that implement a predetermined function. Although the apparatus described in the following embodiments are preferably implemented in software, implementations by hardware or a combination of software and hardware are also possible and contemplated.

Figure 2:
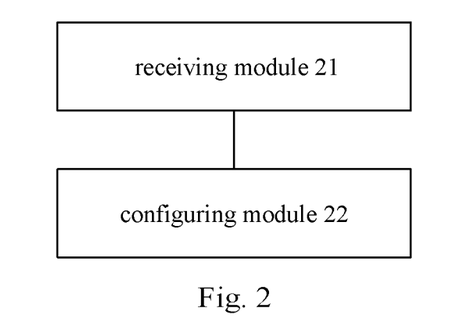
FIG. 2 is a schematic structural diagram of an apparatus for terminal configuration management according to an embodiment of the present disclosure.

FIG. 2 is a schematic structural diagram of an apparatus for terminal configuration management according to an embodiment of the present disclosure. The apparatus for terminal configuration management is applied to a first NFC terminal. As illustrated in FIG. 2, the apparatus includes a receiving module 21 and a configuring module 22.

The receiving module 21 is configured to receive configuration management data from a second NFC terminal, and the configuring module 22 is configured to perform configuration update on the first NFC terminal according to the configuration management data.

Figure 3:
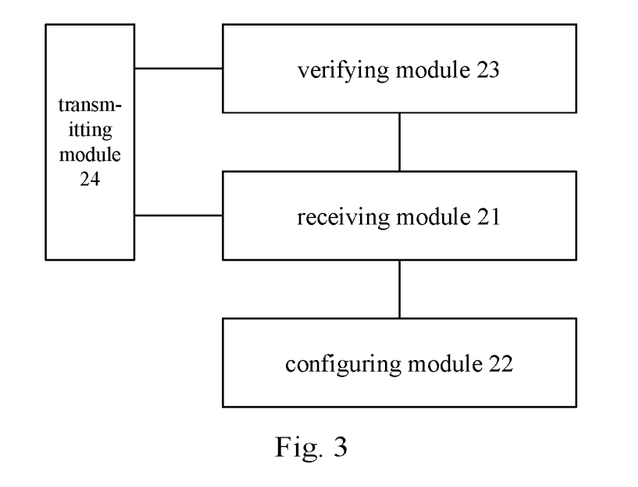
FIG. 3 is a schematic structural diagram of an apparatus for terminal configuration management according to another embodiment of the present disclosure.

FIG. 3 is a schematic structural diagram of an apparatus for terminal configuration management according to another embodiment of the present disclosure. Based on the structure of the embodiment illustrated in FIG. 2, as illustrated in FIG. 3, the apparatus for terminal configuration management provided in this embodiment further includes: a verifying module 23 configured to perform configuration function verification on the configuration management data after the configuration management data is received from the second NFC terminal by the receiving module 21; and a transmitting module 24 configured to, in a case where the configuration function verification performed by the verifying module 23 on the configuration management data has failed, transmit error information corresponding to the configuration management data on which the verification has failed to the second NFC terminal. Accordingly, the receiving module 21 is further configured to receive a solution corresponding to the error information from the second NFC terminal. Optionally, the configuring module 22 in this embodiment is further configured to perform configuration update on the first NFC terminal according to the solution received by the receiving module 21.

Optionally, the first NFC terminal in this embodiment includes at least one of: a home gateway device, a router device, and an audio video player device; and the second NFC terminal includes a mobile terminal having NFC function.

In practice, each of the above modules may be implemented by software or hardware, and the latter may be implemented by, but not limited to: the above modules being all located in the same processor; or the above modules being located in multiple processors respectively.

Figure 4:
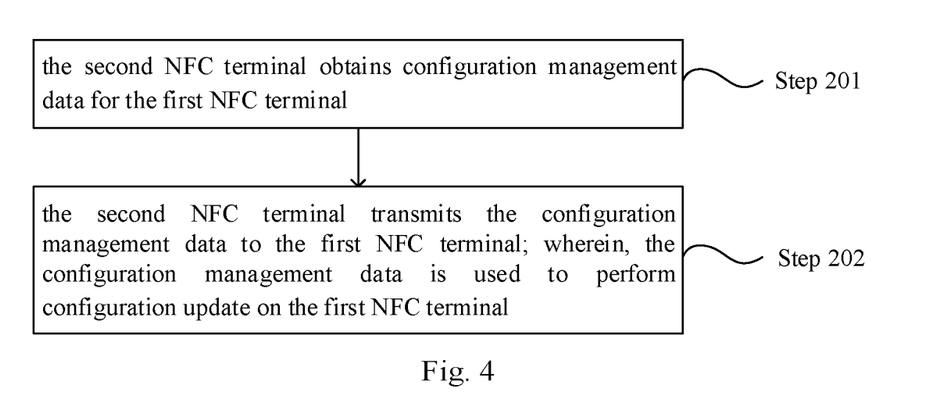
FIG. 4 is a flowchart of a method for terminal configuration management according to another embodiment of the present disclosure.

A method for terminal configuration management is provided in another embodiment of the present disclosure. FIG. 4 is a flowchart of a method for terminal configuration management according to another embodiment of the present disclosure. As illustrated in FIG. 4, the process for this embodiment includes the following steps, i.e., step 201 to step 202.

At step 201, the second NFC terminal obtains configuration management data for the first NFC terminal.

At step 202, the second NFC terminal transmits the configuration management data to the first NFC terminal, wherein the configuration management data is used to perform configuration update on the first NFC terminal.

It can be seen that, through the above steps, an NFC terminal in an embodiment of the present disclosure can obtain configuration management data for performing configuration update on the NFC terminal through another NFC terminal. Compared with the method used in existing art, which includes connecting, by an NFC terminal product to be configured, to a computer through a wired or wireless connection, entering into an Internet Explorer (IE) configuration page based on the computer, and changing configuration items, through the above steps 201 and 202, performing configuration management between NFC terminal products through configuration data interaction in the point-to-point mode is realized, thereby an effect of quickly obtaining the configuration management data without relying on wired networks is achieved.

The purpose of receiving the configuration management data from the second NFC terminal by the first near field communication NFC terminal is to perform configuration update on the first NFC terminal by using the correct configuration management data. In an optional embodiment of the present disclosure, after the second NFC terminal transmits the configuration management data to the first NFC terminal, the method further includes: in a case where the configuration function verification performed by the first NFC terminal on the configuration management data has failed, receiving, by the second NFC terminal, error information transmitted by the first NFC terminal and corresponding to the configuration management data on which the verification has failed. The second NFC terminal transmits the error information to a fault processing platform, receives a solution corresponding to the error information from the fault processing platform, and transmits the solution to the first NFC terminal.

In an optional embodiment of the present disclosure, the method further includes: modifying, by the second NFC terminal, the configuration management data. The second NFC terminal transmits the modified configuration management data to the first NFC terminal. Thus, the first NFC terminal may configure the first NFC terminal according to the modified configuration management data.

The above step 201 involves that the second NFC terminal obtains the configuration management data for the first NFC terminal. In practice, the second NFC communication terminal may obtain the configuration management data for the first NFC terminal in multiple manners, examples are as follows. In an optional embodiment, the second NFC terminal may download the configuration management data through a network. In another optional embodiment, the second NFC terminal may obtain the configuration management data locally from the second NFC terminal. In still another embodiment, the second NFC terminal may receive the configuration management data from data configuration software.

In an optional embodiment of the present disclosure, the second NFC terminal includes a mobile terminal having NFC function; and the first NFC terminal includes at least one of: a home gateway device, a router device, and an audio video player device.

Through the above description of the embodiments, those skilled in the art may clearly understand that, the method according to the above embodiments may be implemented by software plus necessary universal hardware platform, and of course, may also be implemented by hardware. However, in many cases, the former is a better implementation. Based on such understanding, the embodiments of the present disclosure described above may be embodied in the form of a software product which is stored on a storage medium (such as ROM/RAM, magnetic disk, compact disc) and may include several instructions for enabling a terminal device (which may be a mobile phone, a computer, a server, a network device, or the like) to execute the method described in each embodiment of the present disclosure.

An embodiment of the present disclosure further provides an apparatus for terminal configuration management. The apparatus is configured to implement the above embodiments and optional implementations, and descriptions that have been made will not be repeated here again. As used below, the term "module" may be a combination of software and/or hardware that implement a predetermined function. Although the apparatus described in the following embodiments are preferably implemented in software, implementations by hardware or a combination of software and hardware are also possible and contemplated.

Figure 5:
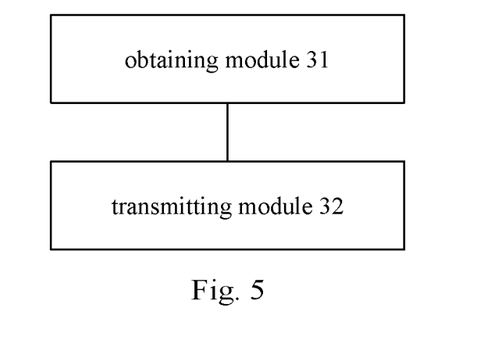
FIG. 5 is a schematic structural diagram of an apparatus for terminal configuration management according to still another embodiment of the present disclosure.

FIG. 5 is a schematic structural diagram of an apparatus for terminal configuration management according to still another embodiment of the present disclosure. The apparatus for terminal configuration management according to this embodiment is applied to a second NFC terminal. As illustrated in FIG. 5, the terminal configuration management apparatus includes an obtaining module 31 and a transmitting module 32.

The obtaining module 31 is configured to obtain configuration management data for a first NFC terminal; and the transmitting module 32 is configured to transmit the configuration management data obtained by the obtaining module 31 to the first NFC terminal, wherein the configuration management data is used to perform configuration update on the first NFC terminal.

Figure 6:
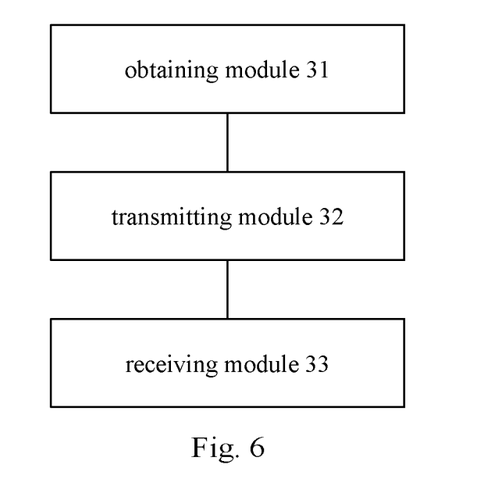
FIG. 6 is a schematic structural diagram of an apparatus for terminal configuration management according to still another embodiment of the present disclosure.

FIG. 6 is a schematic structural diagram of an apparatus for terminal configuration management according to still another embodiment of the present disclosure. Based on the structure of the embodiment illustrated in FIG. 5, as illustrated in FIG. 6, the apparatus according to this embodiment further includes a receiving module 33. In a case where the configuration function verification performed by the first NFC terminal on the configuration management data has failed, the receiving module 33 receives error information transmitted by the first NFC terminal and corresponding to the configuration management data on which the verification has failed. Accordingly, the transmitting module 32 is further configured to transmit the error information received by the receiving module 33 to a fault processing platform, and the receiving module 33 is further configured to receive a solution corresponding to the error information from the fault processing platform; and the transmitting module 33 is further configured to transmit the solution received by the receiving module 33 to the first NFC terminal.

Figure 7:
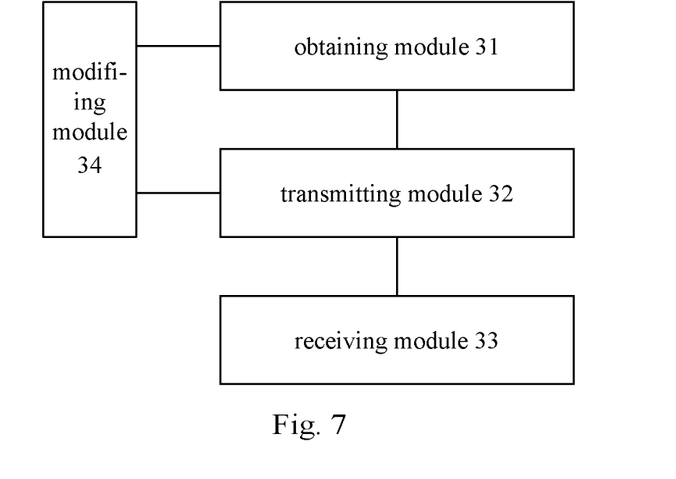
FIG. 7 is a schematic structural diagram of an apparatus for terminal configuration management according to still another embodiment of the present disclosure.

FIG. 7 is a schematic structural diagram of an apparatus for terminal configuration management according to still another embodiment of the present disclosure. Based on the structure of the embodiment illustrated in FIG. 6, as illustrated in FIG. 7, the apparatus according to this embodiment further includes a modifying module 34 configured to modify the configuration management data obtained by the obtaining module 31. Accordingly, the transmitting module 32 is further configured to transmit the configuration management data modified by the modifying module to the first NFC terminal.

Figure 8:
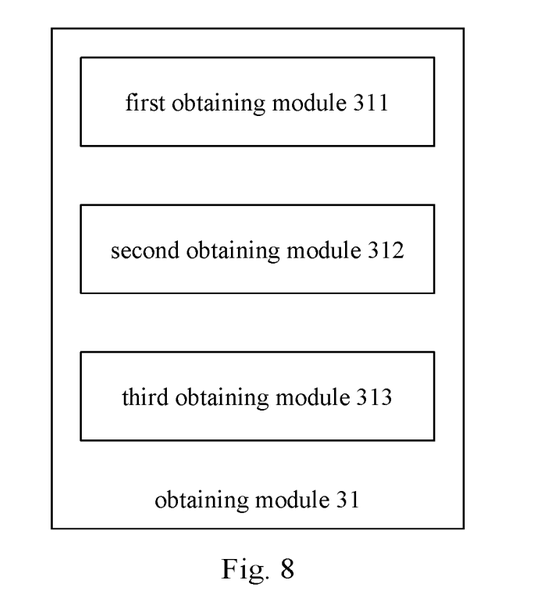
FIG. 8 is a schematic structural diagram of an obtaining module in an apparatus for terminal configuration management according to an embodiment of the present disclosure.

FIG. 8 is a schematic structural diagram of an obtaining module in an apparatus for terminal configuration management according to an embodiment of the present disclosure. As illustrated in FIG. 8, the obtaining module 31 in this embodiment includes at least one of: a first obtaining unit 311 configured to download the configuration management data through a network; a second obtaining unit 312 configured to obtain the configuration management data locally from the second NFC terminal; and a third obtaining unit 313 configured to receive the configuration management data from data configuration software.

Optionally, the second NFC terminal in this embodiment of the present disclosure includes a mobile terminal having NFC function; and the first NFC terminal includes at least one of: a home gateway device, a router device, and an audio video player device.

In practice, each of the above modules may be implemented by software or hardware, and the latter may be implemented by, but not limited to: the above modules being all located in the same processor; or the above modules being located in multiple processors respectively.

An embodiment of the present disclosure further provides a storage medium. Optionally, in this embodiment, the above storage medium may be configured to store program code for performing the following steps S1 and S2.

At step S1, a first NFC terminal receives the configuration management data from a second NFC terminal.

At step S2, the first NFC terminal performs configuration update on the first NFC terminal according to the configuration management data.

Optionally, the storage medium is further configured to store program code for performing the following steps S3 and S4.

At step S3, the second NFC terminal obtains the configuration management data for the first NFC terminal.

At step S4, the second NFC terminal transmits the configuration management data to the first NFC terminal, wherein the configuration management data is used to perform configuration update on the first NFC terminal.

Optionally, in this embodiment, the above storage medium may include, but not limited to, various media that can store program code, such as a U disk, a read-only memory (ROM), a random access memory (RAM), a mobile hard disk, a magnetic disk or compact disc, and the like.

Optionally, in this embodiment, the processor executes the above steps S1 and S2 according to the program codes stored in the storage medium.

Optionally, in this embodiment, the processor executes the above steps S3 and S4 according to the program codes stored in the storage medium.

Optionally, specific examples in this embodiment may refer to the examples described in the foregoing embodiments and optional implementations, and details are not described herein again in this embodiment.

According to embodiments of the present disclosure, it is provided a system and method for configuration management of terminal product in a point-to-point mode. A terminal device having NFC function may obtain configuration management data for an NFC terminal device to be configured, and may modify and save the configuration data. The configuration data is transmitted to the NFC terminal device to be configured by using the NFC function. Then, the NFC terminal device to be configured may perform configuration update, configuration item verification, and fault processing without depending on wired network environment. That is, configuration management for terminal products, locating and analysis for faults, verification and feedback for solutions for faults may also be easily completed without wired network environment.

The terminal product mentioned in the embodiments of the present disclosure includes, but is not limited to, a home gateway device, a routing device, a media playback device, and the like which is triple-play apparatus.

The embodiments of the present disclosure adopt the following technical solutions:

The first NFC terminal device includes, but is not limited to, a home gateway product, a router device, and an audio and video playback device, and the like. The second NFC terminal device includes, but is not limited to, an NFC enabled mobile phone, an NFC enabled tablet, and the like. The second NFC terminal device possesses features such as functional operations being visible, being easy to input, etc. NFC enabled terminals are collectively referred to as NFC terminals hereinafter.

The second NFC terminal device obtains configuration management data such as configuration management APP, configuration file, version data and the like for the first NFC terminal, and may query, modify and save configuration items, which are transmitted to the first NFC terminal by using NFC functions. Thereby, configuration management for the first NFC terminal device is achieved.

The first NFC terminal performs configuration function verification on the configuration items. If the verification fails, the data information relating to the failure may be collected and transmitted to the second NFC device by using NFC function. The second NFC device transmits the data information to a remote fault processing platform. After analyzing and processing, the fault processing platform transmits a solution for fault to the second NFC device. The second NFC device transmits the solution to the first NFC device by using NFC function for verification.

Figure 9:
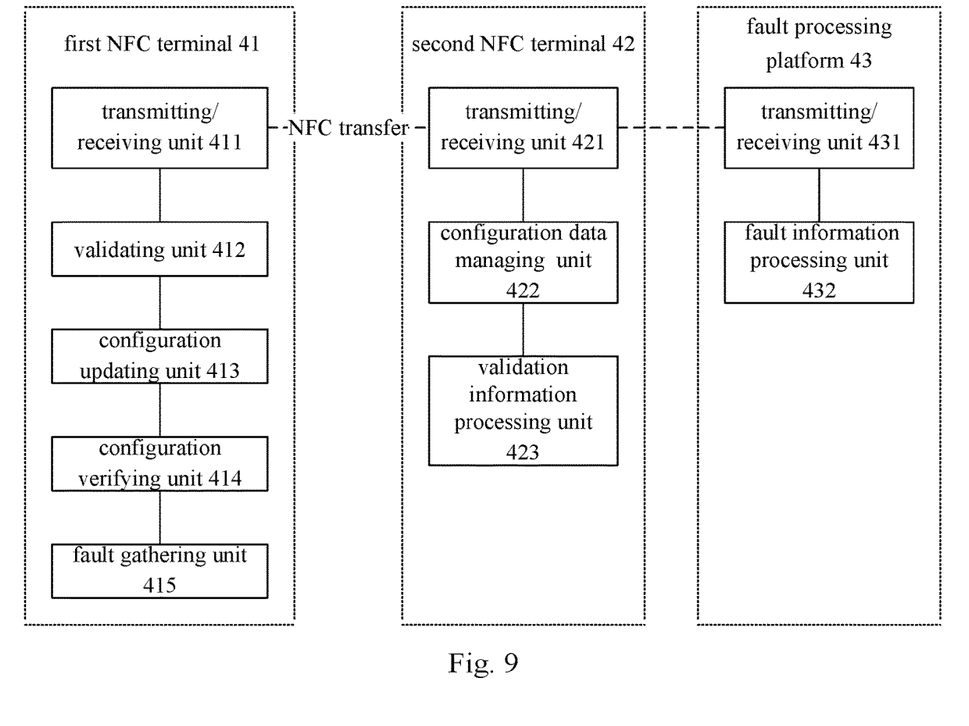
FIG. 9 is a schematic diagram of relationship between respective management units of an NFC terminal according to an embodiment of the present disclosure.

FIG. 9 is a schematic diagram of relationship between respective management units of NFC terminals according to embodiments of the present disclosure. The relationship between respective configuration management units in the NFC devices is illustrated below with reference to FIG. 9.

The second NFC terminal 42 obtains the configuration management data for the first NFC terminal 41 through the transmitting/receiving unit 421. The two NFC terminals are in contact with each other, or are close to each other but not in contact. By using the NFC function, the second NFC terminal 42 transmits the configuration data information to the first NFC terminal 41 through the transmitting/receiving unit 421. After receiving the configuration data through the transmitting/receiving unit 411, the first NFC terminal 41 provides the second NFC terminal 42 with validation information of whether the configuration data is successfully received as well as whether a retransmission is required. The validation information is processed by the validation information processing unit 423 of the NFC terminal 42.

After receiving the configuration data through the transmitting/receiving unit 411 successfully, the first NFC terminal 41 may validate the configuration data through the validating unit 412, perform configuration update through the configuration updating unit 413, and perform function verification for configuration items through the configuration verifying unit 414. If the function verification for configuration items fails, the data information relating to the failure is obtained and saved by the fault gathering unit 415, and transmitted to the second NFC terminal 42 through the transmitting/receiving unit 411 by using NFC function. The second NFC terminal 42 transmits the obtained fault related information to a fault processing platform 43 at the IP side through the transmitting/receiving unit 421. The transmitting/receiving unit 431 of the fault processing platform 43 transfers the obtained fault related information to the fault information processing unit 432. The fault information processing unit 432 analyzes the fault information and provides a solution. The transmitting/receiving unit 431 of the fault processing platform 43 transmits the solution for fault to the second NFC terminal 42. The transmitting/receiving unit 421 of the second NFC terminal 42 transmits the solution for fault to the first NFC terminal 41 by using NFC function. Then, the first NFC terminal 41 performs verification for the solution. If the verification fails, the process of obtaining and transmitting the fault related information is repeated until the fault is solved. If the verification is successful, the fault is solved and the configuration function verification for the next configuration item is performed.

The first NFC terminal 41 may need to modify parameters for a configuration item, which may also be modified by the second NFC terminal 42. Where the configuration parameters for the first NFC terminal 42 have been obtained by the second NFC terminal 42, the configuration modification management for the first NFC device can be completed by modifying and saving the configuration parameters through the configuration data managing unit 422 of the second NFC terminal 42, and transmitting the configuration parameters to the first NFC device by using NFC function.

Figure 10:
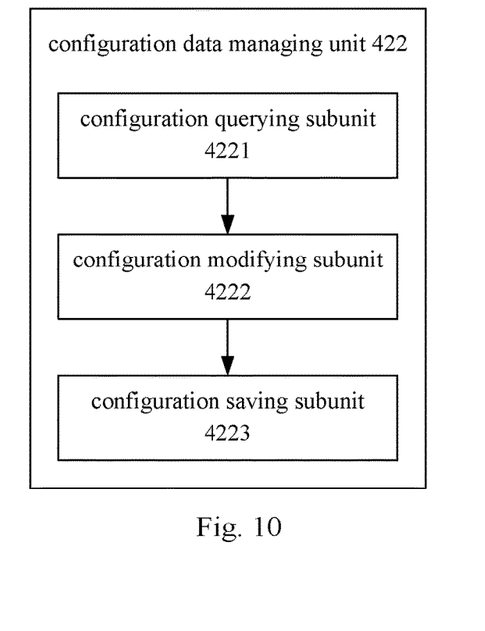
FIG. 10 is a schematic structural diagram of a configuration data managing unit in the NFC terminal according to the embodiment illustrated in FIG. 9.

FIG. 10 is a schematic structural diagram of a configuration data managing unit in the NFC terminal according to the embodiment illustrated in FIG. 9. The configuration and function of each subunit in the configuration data managing unit 422 are illustrated below with reference to FIG. 10.

The second NFC terminal 42 may obtain parameters for a configuration item through the configuration querying subunit 4221. A user may modify a configuration item through the configuration modifying subunit 4222, and may choose whether to save the modified configuration data through the configuration saving subunit 4223.

The working principle of performing configuration data management and control between NFC terminals are described in detail below according to embodiments of the present disclosure.

First of all, for the purpose of easy understanding, the first NFC terminal in the following embodiments is described by an NFC enabled home gateway, and the second NFC terminal is described by an NFC enabled mobile phone.

Figure 11:
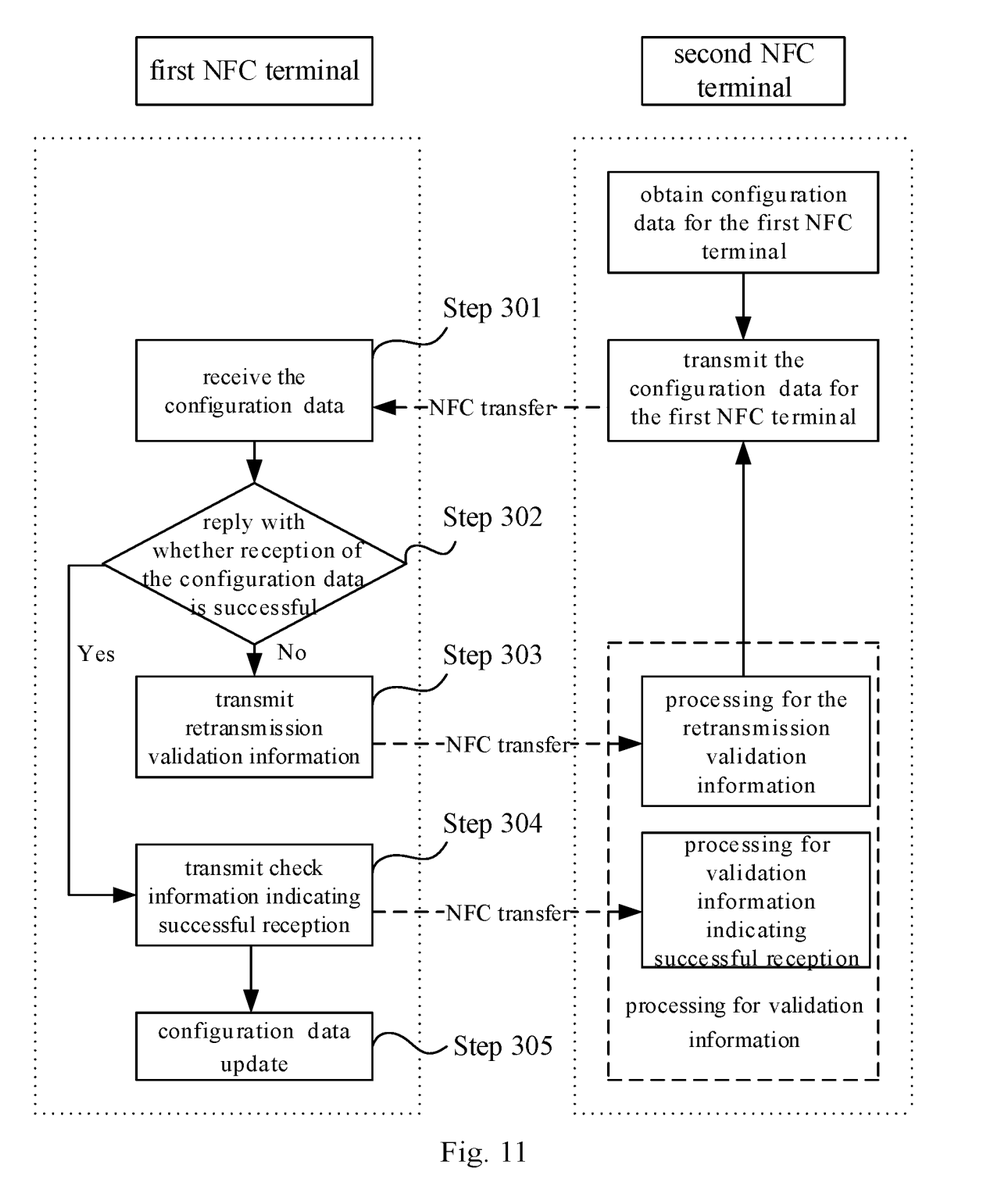
FIG. 11 is a schematic diagram illustrating the working principle for configuration management of an NFC terminal according to an embodiment of the present disclosure.

FIG. 11 is a schematic diagram illustrating the working principle for configuration management of an NFC terminal according to an embodiment of the present disclosure. An embodiment of the present disclosure is described with reference to FIG. 11, wherein parameter configuration for a home gateway device is implemented by an NFC enabled mobile phone.

The embodiment includes the following steps 301 to 305.

At step 301, the home gateway receives the required configuration data. Proceed to step 302.

The transmitting/receiving unit of the NFC enabled mobile phone may obtain the configuration data required by the home gateway when it is installed. The way for the obtaining the configuration data includes, but is not limited to: downloading, by the NFC enabled mobile phone, the configuration data through a data network; storing the configuration data in a memory card of the NFC enabled mobile phone; and transmitting, by a software used for data configuration, the configuration data directly to the NFC enabled mobile phone.

The NFC enabled mobile phone contacts the home gateway or is close to but not in contact with the home gateway. The NFC enabled mobile phone transmits the configuration data to the home gateway by using NFC function. The transmitting/receiving unit of the home gateway completes the receiving of the configuration data.

At step 302, after reception of the configuration data transmitted from the mobile phone, the home gateway replies to the NFC enabled mobile phone with information such as whether the reception is successful, and whether retransmission is required. If the reception is successful, proceed to step 304; and if the reception fails, proceed to step 303.

At step 304, the home gateway feeds back the validation information indicating successful reception to the NFC enabled mobile phone. Proceed to step 305.

The transmitting/receiving unit of the home gateway feeds back the validation information indicating successful reception of the configuration data to the NFC enabled mobile phone. The transmitting/receiving unit of the NFC enabled mobile phone receives the information and transmits the information to the validation information processing unit for validation processing.

At step 303, the home gateway feeds back information indicating failures in reception, i.e., retransmission validation information, to the NFC mobile, to request retransmission of the configuration management data and proceed to step 301.

The transmitting/receiving unit of the home gateway feeds back the information indicating failures in reception of the configuration data and a retransmission request to the NFC enabled mobile phone. The transmitting/receiving unit of the NFC enabled mobile phone receives the information, and transmits the information to the validation information processing unit for retransmission of the configuration data.

At step 305, the home gateway completes the configuration data update.

Another embodiment of the present disclosure is described with reference to FIG. 11, wherein version update management for a home gateway device is implemented by an NFC enabled mobile phone.

The embodiment also includes the following steps 301 to 305.

At step 301, the home gateway receives the data to be used for version update. And then, proceed to step 302.

The transmitting/receiving unit of the NFC enabled mobile phone may obtain the data to be used for version update for the home gateway. The way for obtaining the data includes, but is not limited to: downloading, by the NFC enabled mobile phone, the version data through a data network; storing the version data in a memory card of the NFC enabled mobile phone; and transmitting, by a software used for data configuration, the version data directly to the NFC enabled mobile phone.

The NFC enabled mobile phone contacts the home gateway or is close to but not in contact with the home gateway. The NFC enabled mobile phone transmits the version data directly to the home gateway by using NFC function. The transmitting/receiving unit of the home gateway completes the reception of the data to be used for update.

At step 302, after the reception of the configuration data transmitted from the mobile phone, the home gateway replies to the NFC enabled mobile phone with information such as whether the reception is successful, and whether retransmission is required. If the reception is successful, proceed to step 304; and if the reception fails, proceed to step 303.

At step 304, the home gateway feeds back the validation information indicating successful reception to the NFC enabled mobile phone. And then proceed to step 305.

The transmitting/receiving unit of the home gateway feeds back the validation information indicating successful reception of the version data to the NFC enabled mobile phone. The transmitting/receiving unit of the NFC enabled mobile phone receives the information and transmits the information to the validation information processing unit for validation processing.

At step 303, the home gateway feeds back information indicating failures in reception, i.e., retransmission validation information, to the NFC mobile to requests retransmission of the version data and proceed to step 301.

The transmitting/receiving unit of the home gateway feeds back the information indicating failures in reception of the version data and a retransmission request to the NFC enabled mobile phone. The transmitting/receiving unit of the NFC enabled mobile phone receives the information, and transmits the information to the validation information processing unit for retransmission of the version data.

At step 305, The home gateway completes the version update.

Figure 12:
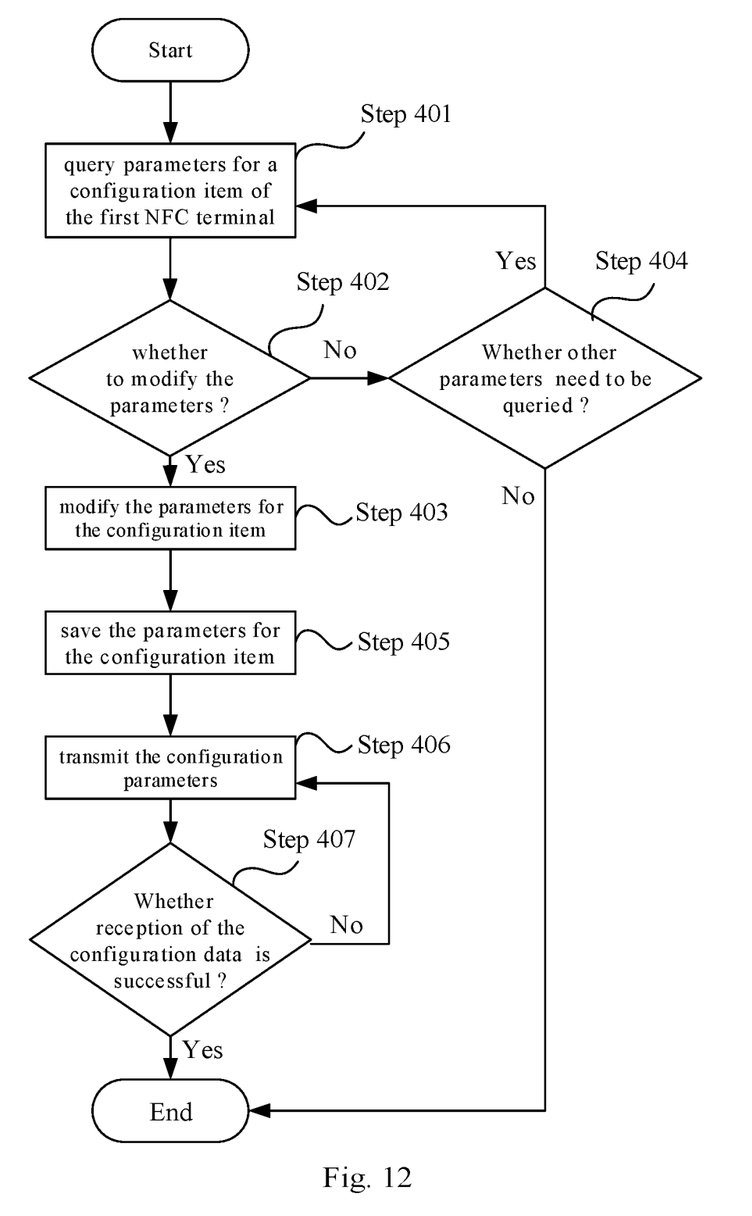
FIG. 12 is a schematic diagram illustrating the working principle for configuration modification of an NFC terminal according to an embodiment of the present disclosure.

FIG. 12 is a schematic diagram illustrating the working principle for configuration modification of an NFC terminal according to an embodiment of the present disclosure. An embodiment of the present disclosure is described with reference to FIG. 12, wherein the working process for configuration modification of a home gateway through an NFC enabled mobile phone is described.

The embodiment includes the following steps 401 to 407.

At step 401, parameters for a configuration item of the home gateway (i.e., the first NFC terminal) are queried based on an NFC enabled mobile phone. For example, information such as parameters for the configuration item, valid range of the parameters for the configuration item, and recommended values for the parameters for the configuration item may be obtained. Proceed to step 402.

At step 402, a user may determine whether to modify the parameters for the configuration item as required. If the parameters for the configuration item need to be modified, proceed to step 403; otherwise, proceed to step 404.

At step 404, it is determined whether other parameters for the configuration item need to be queried. If required, proceed to step 401; otherwise, the process would end.

At step 403, modify the parameters for the configuration item, and then proceed to step 405.

At step 405, save the parameters for the configuration item and then proceed to step 406.

At step 406, transmit the configuration data to the home gateway (i.e., the first NFC terminal), and then proceed to step 407.

The NFC enabled mobile phone contacts the home gateway or is close to but not in contact with the home gateway, and data transfer with each other may be completed by using NFC function.

At step 407, receive validation information transmitted by the home gateway, and determine whether reception of the configuration data by the home gateway (i.e., the first NFC terminal) is successful. If the reception of the configuration data by the home gateway fails, and the configuration data is requested to be retransmitted, step 406 would be performed. If the reception of the configuration data by the home gateway is successful, the process would end.

Figure 13:
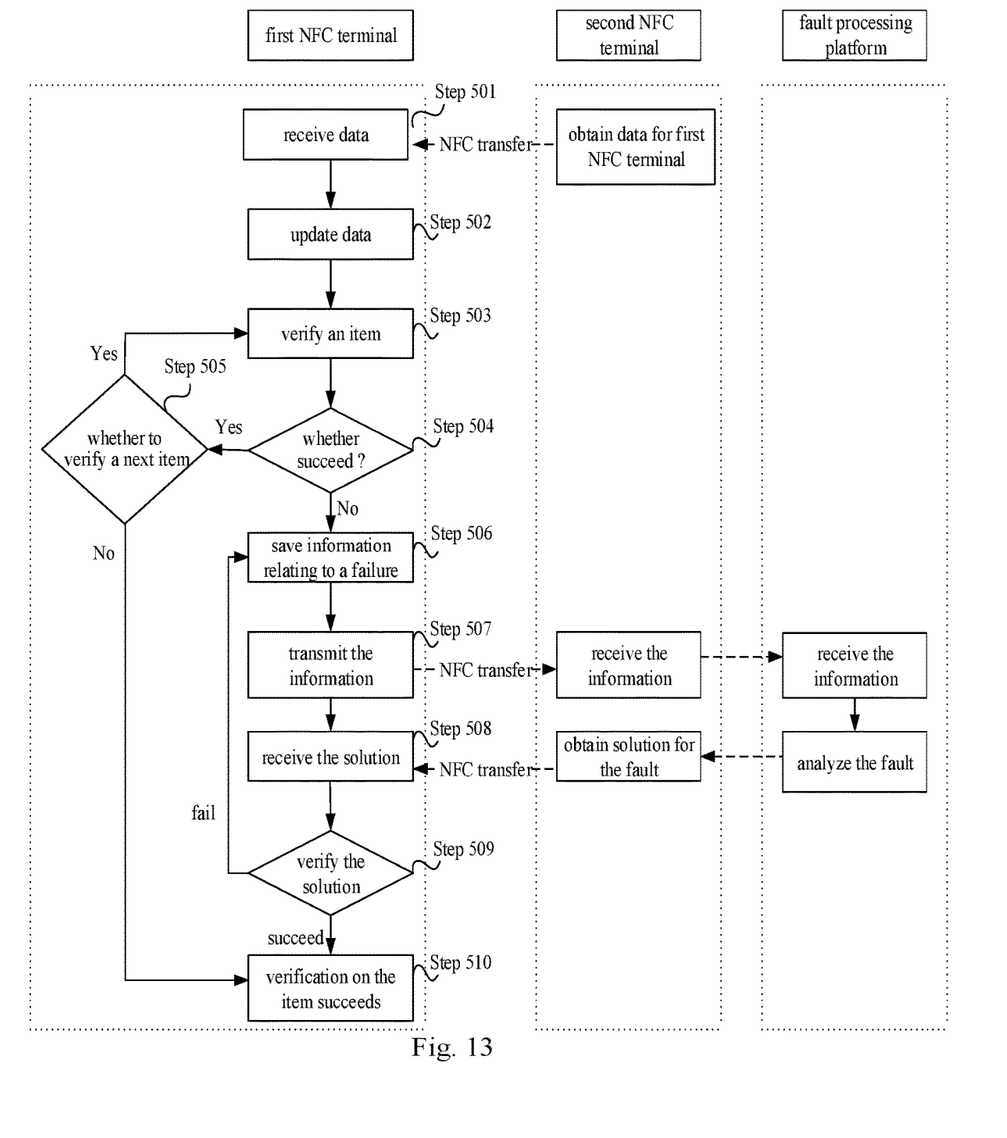
FIG. 13 is a schematic diagram illustrating the working principle for configuration fault processing of an NFC terminal according to an embodiment of the present disclosure.

FIG. 13 is a schematic diagram illustrating the working principle for configuration failure processing of an NFC terminal according to an embodiment of the present disclosure. An embodiment of the present disclosure is described with reference to FIG. 13, wherein the working process of troubleshooting for configuration fault of a home gateway through an NFC enabled mobile phone is described.

The embodiment includes the following steps 501 to 510.

At step 501, the home gateway receives the configuration data transmitted by the NFC enabled mobile phone. Then, proceed to step 502.

The NFC enabled mobile phone contacts with the home gateway or is close to but not in contact with the home gateway, and data transfer with each other may be completed by using NFC function.

At step 502, the home gateway updates the configuration data that has been successfully received. Then, proceed to step 503.

At step 503, a user performs function verification on a configuration item based on the home gateway. Then, proceed to step 504.

At step 504, it is determined whether the function verification is successful. If successful, proceed to step 505; otherwise, proceed to step 506.

At step 505, the user determines whether function verification on a next configuration item is required. If required, proceed to step 503; otherwise, proceed to step 510.

At step 506, data information relating to the configuration item on which the function verification has failed is collected and saved through a fault gathering unit. Proceed to step 507.

At step 507, the home gateway contacts the home gateway or is close to but not in contact with the home gateway. The data information relating to the configuration item for which the function verification has failed is transmitted to the NFC enabled mobile phone through an NFC function module. The mobile phone transmits the received data information relating to the configuration item for which the function verification has failed to the fault processing platform. The fault information processing unit in the fault processing platform analyzes and processes the data information, and transmits a solution for fault to the NFC enabled mobile phone through a receiving/transmitting unit in the platform. The NFC enabled mobile phone transmitting/receiving unit transmits the received solution for fault to the home gateway by using NFC function. Proceed to step 508.

At step 508, the home gateway contacts the home gateway or is close to but not in contact with the home gateway. The solution for fault is received through the NFC function. Proceed to step 509.

At step 509, the user performs verification on the solution for fault based on the home gateway. If the verification performed on the solution for fault is successful, proceed to step 510; otherwise, proceed to step 506.

At step 510, the verification performed on the solution for fault is successful, and the process ends.

Figure 14:
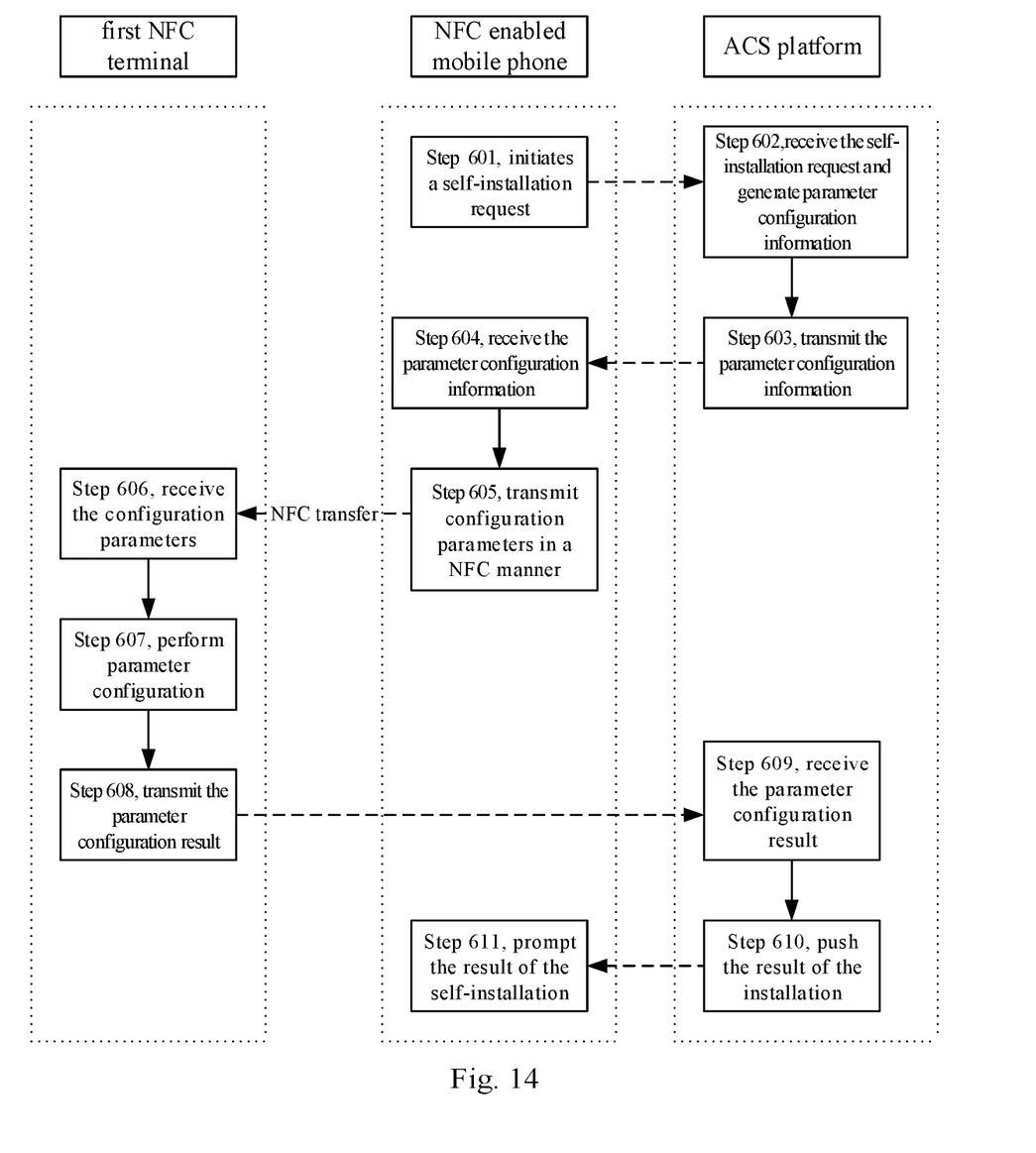
FIG. 14 is a schematic diagram illustrating an NFC-based self-installation operation according to an embodiment of the present disclosure.

Optionally, the function of the NFC parameter configuration method is similar to that of Auto-Configuration Server (ACS for short) in existing art, thus a home gateway self-installation process based on NFC may be implemented. FIG. 14 is a schematic diagram illustrating a self-installation operation based on NFC according to an embodiment of the present disclosure. An embodiment of the present disclosure is described with reference to FIG. 14, wherein the working process of self-installation based on NFC is described.

The embodiment includes the following steps 601 to 611.

At step 601, a user initiates a self-installation request on an NFC enabled mobile phone. The request causes connecting to an ACS server through a network for the mobile phone, and carries relevant authentication information.

At step 602, after reception of the user-initiated installation request, the ACS platform authenticates the authentication information of the user, and generates parameter configuration information according to the user information.

At step 603, transmit the parameter configuration information to the user's mobile phone.

At step 604, the NFC enabled mobile phone receives the configuration information transmitted by the ACS.

At step 605, transmit the parameters to be used for configuration to the home gateway through NFC.

At step 606, the home gateway receives the parameters to be used for configuration.

At step 607, the home gateway performs parameter configuration.

The home gateway and the NFC enabled mobile phone complete the parameter configuration through processes described in above embodiments.

At step 608, after all the parameter configuration is completed, the home gateway transmits the parameter configuration result to the ACS server in an Inform manner.

At step 609, the ACS service receives the parameter configuration result transmitted by the home gateway.

At step 610, the result of the installation is pushed to the NFC enabled mobile phone.

At step 611, the NFC enabled mobile phone prompts the user the result of the installation, and the installation process ends.

In conclusion, the method for configuration management for terminal products in the NFC point-to-point mode according to embodiments of the present disclosure possesses features of NFC, such as, not relying on wired networks, high data transmission speed, high information-security, being easy to operate, being easy to manage in real time, and management for configuration data between devices based on the NFC function of terminal devices being more efficient and convenient. This enables improvement for product experiences and increase in product market competitiveness without increasing hardware cost. Also, the terminal product users can complete the device management more easily, thus enhancing user experience.

Those of ordinary skill in the art may understand that all or parts of the steps of the above embodiments may be implemented by using a computer program process which may be stored in a computer readable storage medium and implemented on a corresponding hardware platform (such as, a system, an apparatus, an equipment, a device, etc.). When executed, the computer program process includes one of or a combination of the steps in a method embodiment.

Optionally, all or part of the steps in the above embodiments may also be implemented by using an integrated circuit. These steps may be implemented by each of the steps being realized by an integrated circuit module respectively, or multiple steps or modules being realized by a single integrated circuit module.

The apparatuses/functional modules/functional units in the above embodiments may be implemented by using general-purpose computing apparatuses, which may be embodied on a single computing apparatus or distributed over a network formed by multiple computing apparatuses.

The apparatuses/functional modules/functional units in the above embodiment may be stored in a computer-readable storage medium when they are implemented in the form of a software functional module and are sold or used as an independent product. The above-mentioned computer-readable storage medium may be a read-only memory, a magnetic disk, an optical disc, or the like.

What is claimed is:

1. A method for terminal configuration management, comprising:

receiving, by a first Near Field Communication (NFC) terminal, configuration management data from a second NFC terminal; and performing, by the first NFC terminal, configuration update on the first NFC terminal according to the configuration management data;

wherein after receiving, by the first NFC terminal, the configuration management data from the second NFC terminal, the method further comprises:

performing, by the first NFC terminal, configuration function verification on the configuration management data;

transmitting, by the first NFC terminal, in a case where the configuration function verification performed on the configuration management data has failed, error information corresponding to the configuration management data on which the verification has failed to the second NFC terminal; and receiving, by the first NFC terminal, a solution corresponding to the error information from the second NFC terminal; and wherein the second NFC terminal is a mobile terminal having an NFC function; and the mobile terminal obtains the configuration management data for the first NFC terminal, modifies the configuration management data according to a user instruction, and transmits the modified configuration management data to the first NFC terminal by using the NFC function, wherein the first NFC terminal is a home gateway; the second NFC terminal initiates a self-installation request of a user, connects to an Auto-Configuration Server (ACS) through a network and carries relevant authentication information; after receiving the self-installation request, the ACS authenticates the relevant authentication information of the user and generates the configuration management data according to user information.

2. The method according to claim 1, wherein after receiving, by the first NFC terminal, the solution corresponding to the error information from the second NFC terminal, the method further comprises:

performing, by the first NFC terminal, configuration update on the first NFC terminal according to the solution.

3. The method according to claim 1, wherein the first NFC terminal comprises at least one of: a router device, or an audio video player device.

4. A method for terminal configuration management, comprising:

obtaining, by a second Near Field Communication (NFC) terminal, configuration management data for a first NFC terminal; and transmitting, by the second NFC terminal, the configuration management data to the first NFC terminal;

wherein the configuration management data is used to perform configuration update on the first NFC terminal, wherein after transmitting, by the second NFC terminal, the configuration management data to the first NFC terminal, the method further comprises:

receiving, by the second NFC terminal, in a case where configuration function verification performed by the first NFC terminal on the configuration management data has failed, error information transmitted by the first NFC terminal and corresponding to the configuration management data on which the verification has failed;

transmitting, by the second NFC terminal, the error information to a fault processing platform;

receiving, by the second NFC terminal, a solution corresponding to the error information from the fault processing platform; and transmitting, by the second NFC terminal, the solution to the first NFC terminal; and wherein the second NFC terminal is a mobile terminal having an NFC function; and the mobile terminal obtains the configuration management data for the first NFC terminal, modifies the configuration management data according to a user instruction, and transmits the modified configuration management data to the first NFC terminal by using the NFC function, wherein the first NFC terminal is a home gateway; the second NFC terminal initiates a self-installation request of a user, connects to an Auto-Configuration Server (ACS) through a network and carries relevant authentication information; after receiving the self-installation request, the ACS authenticates the relevant authentication information of the user and generates the configuration management data according to user information.

5. The method according to claim 4, wherein the second NFC terminal obtains the configuration management data for the first NFC terminal through at least one of the following ways:

downloading the configuration management data through a network, obtaining the configuration management data locally from the second NFC terminal, and receiving the configuration management data from data configuration software.

6. The method according to claim 4, wherein the first NFC terminal comprises at least one of: a router device, or an audio video player device.

7. An apparatus for terminal configuration management, wherein the apparatus is applied to a first Near Field Communication (NFC) terminal and comprises:

a processor;

a memory, wherein the memory stores one or more computer readable program codes, and the processor is configured to execute the computer readable program codes to:

receive configuration management data from a second NFC terminal;

perform configuration update on the first NFC terminal according to the configuration management data;

perform configuration function verification on the configuration management data after the configuration management data is received from the second NFC terminal; and in a case where the configuration function verification performed on the configuration management data has failed, transmit error information corresponding to the configuration management data on which the verification has failed to the second NFC terminal;

wherein the processor is further configured to receive a solution corresponding to the error information from the second NFC terminal; and wherein the second NFC terminal is a mobile terminal having an NFC function; and the mobile terminal obtains the configuration management data for the first NFC terminal, modifies the configuration management data according to a user instruction, and transmits the modified configuration management data to the first NFC terminal by using the NFC function, wherein the first NFC terminal is a home gateway; the second NFC terminal initiates a self-installation request of a user, connects to an Auto-Configuration Server (ACS) through a network and carries relevant authentication information; after receiving the self-installation request, the ACS authenticates the relevant authentication information of the user and generates the configuration management data according to user information.

8. The apparatus according to claim 7, wherein the processor is further configured to perform configuration update on the first NFC terminal according to the solution received.

9. The apparatus according to claim 7, wherein the first NFC terminal comprises at least one of: a router device, or an audio video player device.

10. An apparatus for terminal configuration management, wherein the apparatus is applied to a second Near Field Communication (NFC) terminal and comprises:

a processor;

a memory, wherein the memory stores one or more computer readable program codes, and the processor is configured to execute the computer readable program codes to:

obtain configuration management data for a first NFC terminal;

transmit the configuration management data obtained to the first NFC terminal; and in a case where the configuration function verification performed by the first NFC terminal on the configuration management data has failed, receive error information transmitted by the first NFC terminal and corresponding to the configuration management data on which the verification has failed;

wherein the configuration management data is used to perform configuration update on the first NFC terminal; and the processor is further configured to transmit the error information received to a fault processing platform, receive a solution corresponding to the error information from the fault processing platform, and transmit the solution received to the first NFC terminal; and wherein the second NFC terminal is a mobile terminal having an NFC function; and the mobile terminal obtains the configuration management data for the first NFC terminal, modifies the configuration management data according to a user instruction, and transmits the modified configuration management data to the first NFC terminal by using the NFC function, wherein the first NFC terminal is a home gateway; the second NFC terminal initiates a self-installation request of a user, connects to an Auto-Configuration Server (ACS) through a network and carries relevant authentication information; after receiving the self-installation request, the ACS authenticates the relevant authentication information of the user and generates the configuration management data according to user information.

11. The apparatus according to claim 10, wherein the processor is further configured to:

download the configuration management data through a network;

obtain the configuration management data locally from the second NFC terminal; and receive the configuration management data from data configuration software.

12. The apparatus according to claim 10, wherein the first NFC terminal comprises at least one of: a router device, or an audio video player device.

* * * * *